United States Patent
Cornic et al.

(10) Patent No.: US 10,775,496 B2
(45) Date of Patent: Sep. 15, 2020

(54) METHOD OF GUIDANCE OF AN AERIAL TARGET, IN PARTICULAR IN THE VERTICAL LANDING PHASE, AND RADAR SYSTEM IMPLEMENTING SUCH A METHOD

(71) Applicant: THALES, Courbevoie (FR)

(72) Inventors: Pascal Cornic, Brest (FR); Patrick Garrec, Merignac (FR); Patrick Le Bihan, Lannilis (FR)

(73) Assignee: THALES, Courbevoie (FR)

( * ) Notice: Subject to any disclaimer, the term of this patent is extended or adjusted under 35 U.S.C. 154(b) by 334 days.

(21) Appl. No.: 15/933,252

(22) Filed: Mar. 22, 2018

(65) Prior Publication Data
US 2018/0284263 A1 Oct. 4, 2018

(30) Foreign Application Priority Data
Mar. 30, 2017 (FR) ..................................... 17 00343

(51) Int. Cl.
| | |
|---|---|
| G01S 13/58 | (2006.01) |
| G01S 13/91 | (2006.01) |
| G05D 1/06 | (2006.01) |
| G01S 13/87 | (2006.01) |
| G01S 13/90 | (2006.01) |

(52) U.S. Cl.
CPC ............ *G01S 13/913* (2013.01); *G01S 13/58* (2013.01); *G01S 13/87* (2013.01); *G05D 1/0669* (2013.01); *G05D 1/0676* (2013.01); *G01S 13/9064* (2019.05)

(58) Field of Classification Search
CPC ...... G01S 13/58; G01S 13/87; G01S 13/9064; G01S 13/913; G05D 1/0669; G05D 1/0676
See application file for complete search history.

(56) References Cited

U.S. PATENT DOCUMENTS

2010/0109938 A1\* 5/2010 Oswald ................. G01S 13/522
342/90

FOREIGN PATENT DOCUMENTS

| EP | 1 963 942 A1 | 9/2008 |
| FR | 2 878 336 A1 | 5/2006 |

OTHER PUBLICATIONS

M. Soumekh, "Automatic Aircraft Landing Using Interferometric Inverse Synthetic Aperture Radar Imaging," IEEE Transactions on Image Processing, vol. 5, No. 9, Sep. 9, 1996, XP011026059.

\* cited by examiner

*Primary Examiner* — Timothy A Brainard
(74) *Attorney, Agent, or Firm* — Baker & Hostetler LLP (57) ABSTRACT

A method comprises at least: a first radar processing for locating and estimating the trajectory of a target on the basis of measurements of radial distances, of Doppler frequency and of angle of azimuth and of elevation of the target arising from a radar signal emitted towards the target; a second radar processing of location and of trajectory of the target along a vertical axis, by applying the principle of the inverse synthetic antenna; the disparity between the given trajectory and the trajectory estimated by the first processing, projected on a horizontal plane, and the disparity between the given trajectory and the trajectory estimated by the second processing according to the vertical axis being used to control the direction of displacement of the target.

16 Claims, 4 Drawing Sheets

METHOD OF GUIDANCE OF AN AERIAL TARGET, IN PARTICULAR IN THE VERTICAL LANDING PHASE, AND RADAR SYSTEM IMPLEMENTING SUCH A METHOD

CROSS-REFERENCE TO RELATED APPLICATIONS

This application claims priority to foreign French patent application No. FR 1700343, filed on Mar. 30, 2017, the disclosure of which is incorporated by reference in its entirety.

FIELD OF THE INVENTION

The present invention relates to a method of guidance of an aerial target, in particular in the vertical landing phase. It also relates to a radar system implementing such a method.

The technical field of the invention relates in particular to systems for aiding landing or takeoff of piloted or non-piloted craft, and more particularly vertical landing or take-off.

BACKGROUND

A technical problem to be solved is the location of a vertical takeoff or landing craft for which a very high precision of location is sought, according to an economical solution.

This need may relate to the guidance of rotary-wing aircraft, piloted or not, but more particularly to novel systems intended to recover the first stage of rocket launchers.

In this particular case the descent speed is high, thus rendering guidance towards the landing zone very tricky.

Moreover, these systems require very high operating safety, given the cost of the craft that one wishes to recover and the risks incurred, in particular the risks of crashing in an inhabited area.

There exist numerous systems for aiding landing, in particular based on radar technology. Most of these systems are suited to the landing of aircraft carrying out an approach to the touchdown point along a low descent slope, typically 3° and with a relatively low descent speed. The P.A.R. (Precision Approach Radar) system may in particular be cited in this regard.

All these systems are intended to detect long-range targets, typically several tens of kilometres away, thus requiring antennas of large dimensions and high emission power.

They are expensive, unwieldy to implement or are poorly suited to the guidance of craft carrying out a vertical or near-vertical descent slope, in particular when the descent speed is high.

SUMMARY OF THE INVENTION

An aim of the invention is in particular to allow the guidance of craft on landing, at high approach speed, with precision, in complete safety and in an economical manner.

For this purpose, the subject of the invention is a method of guiding an aerial target towards a given trajectory, the said method carrying out at least:

a first radar processing for locating and estimating the trajectory of the said target on the basis of measurements of radial distances, of Doppler frequency and of angles of azimuth and of angles of elevation of the said target arising from a radar signal emitted towards the said target;

a second radar processing for locating and estimating the trajectory of said target, projected on a vertical axis, by applying the principle of the inverse synthetic antenna;

the disparity between the said given trajectory and the trajectory estimated by the said first processing projected on a horizontal plane, and the disparity between the said given trajectory and the trajectory estimated by the second processing, projected on the said vertical axis;

being used to control the direction of displacement of the said target (1), the said direction being controlled in such a way as to reduce the said disparities.

In a particular mode of implementation, the said given aerial trajectory is substantially vertical, the said given trajectory being for example oriented towards a touchdown zone, the said target being in the landing phase.

The said disparities are for example computed by radar processing circuits and transmitted to a displacement direction control system of the said target.

In a possible mode of implementation, the said second processing establishes for example in a continues manner a history of the successive radial velocities measured through the Doppler effect so as to determine a phase replica corresponding to the outbound-inbound path of the radar signal emitted over a limited time interval, the said history being used to construct a correlator of the said signal received, the said correlator being applied for the distance measurement of the said target by the said first processing according to various possible values of the angle of elevation of the said target inside the uncertainty domain of the said first processing. The phase replica that gave the strongest correlation peak determines for example the value of the angle of elevation of the said target and its speed along the vertical axis. The value of the said angle of elevation of the said target is for example refined by measurement of contrast between the amplitude of the correlation peak of maximum level and the replicas of closer neighbourhoods. The measurement of the width of the correlation peak is for example used to estimate the verticality of the trajectory followed by the said target along the vertical axis.

The said second processing, according to the inverse synthetic antenna principle, is for example carried out in an angular domain corresponding to the distance traveled by the said target in the said limited time interval. The said time interval is for example limited by the temporal duration for which the direction of the trajectory of the said target, projected on the said vertical axis, can be considered to be fixed.

The said method uses for example one or more beacons fitted to the said target to establish a pointlike location reference.

The said method uses for example one or more ground beacons to perform differential location measurements.

The said second processing is for example used to estimate the attitude of the said target, the said target being cut according to various slices along the vertical axis, the various correlation peaks relating to the various vertical slices of the object which are shifted temporally for one and the same angle of elevation making it possible to determine advantageously the attitude of the said target.

The said target is for example the first stage of a rocket launcher.

The subject of the invention is also a radar system implementing the method such as described previously. The said system comprises for example a fixed multibeam antenna.

BRIEF DESCRIPTION OF THE DRAWINGS

Other characteristics and advantages of the invention will become apparent with the aid of the description which follows, given in relation to appended drawings which represent.

DETAILED DESCRIPTION

Figure 1:
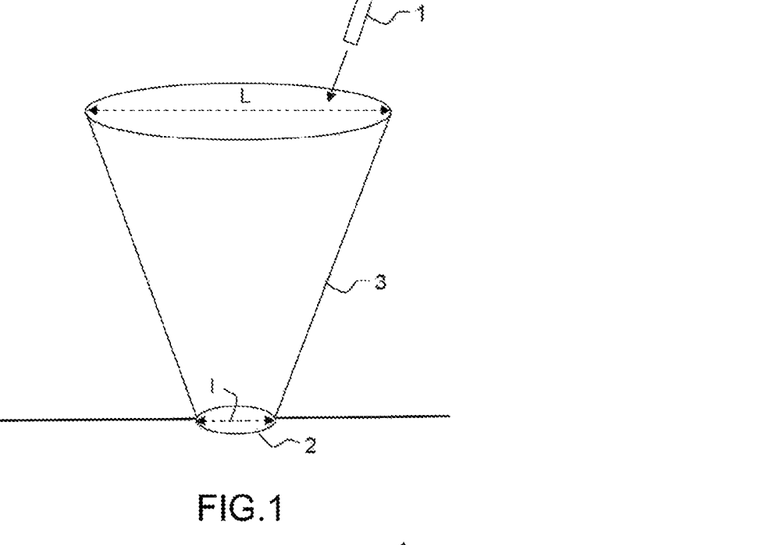
FIG. 1, a situation of guidance of an aerial craft 1 towards a landing zone.

FIG. 1 illustrates a situation of guidance of an aerial craft 1 towards a landing zone 2. The craft 1 is on a near-vertical trajectory, moving at high speed towards this zone 2.

The craft is for example the first stage of a rocket launcher that one wishes to recover after its mission, by landing it on the zone 2. In this case the craft is steered towards the ground while decelerating and while stabilizing in a vertical position by virtue of its propulsion units which are oriented downwards and which ensure an upward thrust.

A problem is to guide this craft so as to bring it onto the landing zone 2 with a zero final speed and in a vertical position. This zone 2 is relatively small, hence the precision necessary for guidance.

To this end, the invention proposes a device making it possible to locate the craft very precisely in the course of its descent and to establish the trajectory of the craft in real time so as to ensure its guidance.

In such a guidance phase, the descent speed may exceed 1000 metres per second at the start of the phase. It is therefore necessary to carry out a first detection of the craft from a minimum altitude H of the order of 10 000 metres in order to make the descent safe.

Given the uncertainty and the possible variations of the approach trajectory, the domain of the trajectory of the craft is determined by a volume 3 which may be likened roughly to a downward pointing cone segment, centred on the landing zone 2.

The horizontal surface to be covered for the initial detection is typically a disc of diameter L of the order of one to several kilometres. The surface of the landing zone may be regarded as a disc of diameter I of the order of a few metres.

The location precision requirements become increasingly strict as the craft approaches the ground. The precision must be for example better than 1 metre at the moment of touchdown.

Figure 2:
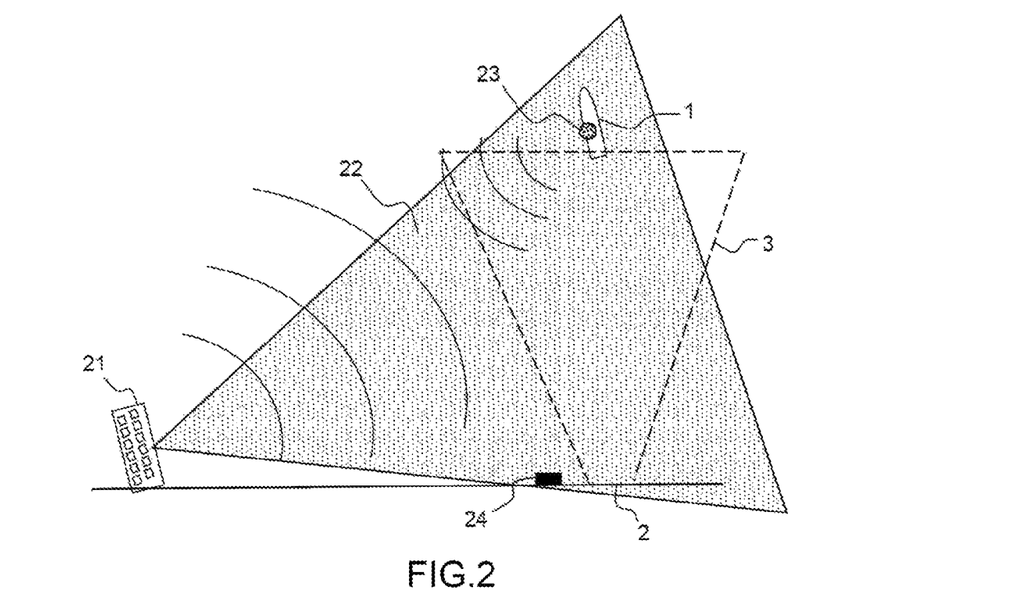
FIG. 2, an illustration of the hardware implementation of the invention.

FIG. 2 illustrates the implementation of the invention. A radar 21 is positioned on the ground a short distance from the landing zone, typically a few kilometres away. The radar can also be positioned at sea on a platform.

The radar 21 is a Doppler radar and comprises a fixed antenna, with an antennal architecture allowing it to illuminate 22 the whole of the domain traversed by the trajectory of the craft inside the cone 3. More precisely, the antenna of the radar is able to illuminate the totality of the trajectory cone in elevation.

For this purpose:

on the one hand the antenna of the radar possesses a wide angular coverage in elevation, for example of the order of 45°;

and on the other hand the antenna is in an inclined position with respect to the vertical, for example of the order 20°, so as to cover the trajectory domain in an optimum manner as illustrated by FIG. 2, the antenna being oriented in such a way that its angular coverage encompasses the totality of the descent trajectory, or climb trajectory, as far as a predetermined altitude.

The radar 21 comprises means of angular location of a target, in azimuth and in elevation.

To facilitate the representation of the radar 21, the latter is represented by its antenna in this FIG. 2.

The azimuthal angular coverage does not need to be large, typically it may be less than 10°.

Figure 3:
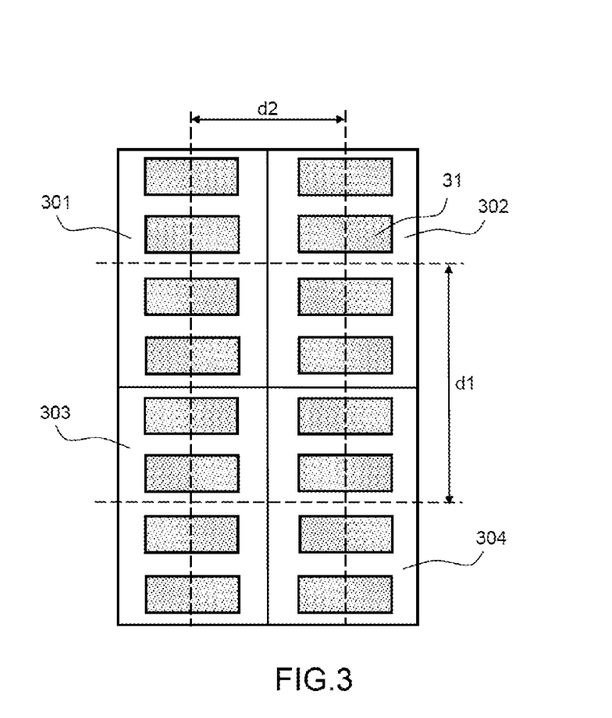
FIG. 3, an exemplary antenna used by a radar implementing the method according to the invention.

FIG. 3 illustrates an exemplary embodiment of the antenna used by a radar according to the invention. It is a 2D array antenna, comprising several reception pathways, four in this example, and covering a wide angular domain in elevation as specified previously.

The antenna 30 thus comprises a plane array of radiating elements 31 allowing it to form various beams in reception each covering a portion of the detection domain 22 covered by the antenna.

In the exemplary embodiment of FIG. 3, the array is formed of four sub-arrays of radiating elements 301, 302, 303, 304 each associated with a reception pathway. In such an antenna, the location precisions are limited by the dimensions d1 and d2 between the phase centres of two consecutive sub-arrays.

The antenna beams are conventionally formed in an analogue manner, by electronic scanning, or by numerical processing, according to the principle of computational beamforming (CBF).

On emission, coverage can be obtained by a single wide beam or by temporal switching of several beams.

Figure 4:
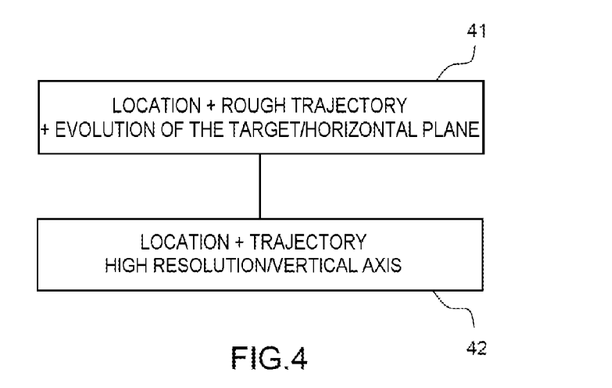
FIG. 4, a presentation of the two radar processings used by the method according to the invention.

FIG. 4 presents the two radar processings 41, 42 implemented by the invention, with a view to guiding the trajectory of a craft 1 towards a given trajectory, in particular a substantially vertical trajectory to reach a touchdown zone 2 with precision. These two radar processings will be described precisely hereinafter. Radar processing is intended to mean a processing implemented by a radar on the basis of radar signals information, these signals arising here from the target 1 to be guided.

The first processing 41 carries out location and a rough trajectory of the craft according to a conventional scheme and determines its evolution in the horizontal plane. More precisely the radar carries out a rough estimation of the position, of the trajectory and of the kinematic parameters of the craft on the basis of measurements of the radial distance, of the radial velocity and of the angles of azimuth and of elevation, in a conventional manner.

The second processing 42, which be carried out in parallel with the first processing 41, carries out location and estimation of the trajectory of the craft at high resolution, projected on the vertical axis, while applying the principle of the inverse synthetic antenna (also called ISAR for "Inverse Synthetic Aperture Radar"), so as to refine the precision of angular measurement of the craft in elevation. Stated otherwise, whilst the principle of the synthetic antenna (principle of SAR for "Synthetic Aperture Radar") utilizes the displacement of the antenna to form a synthetic antenna of larger dimension, the invention advantageously uses the displacement of the target (here the craft 1) to generate a synthetic antenna of large dimension, according to the ISAR principle, thus affording very high angular resolution and very high precision of location.

Figure 5:
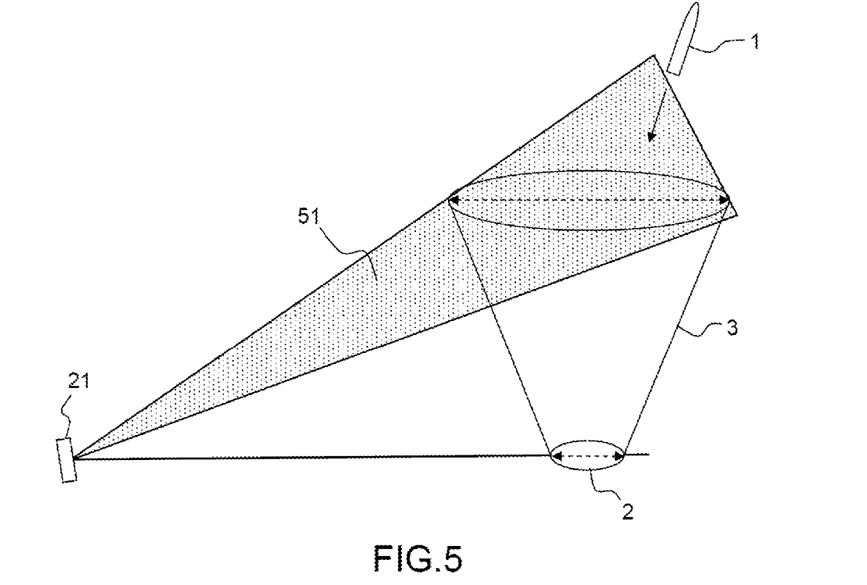
FIG. 5, a first phase of the first radar processing used corresponding to the initial detection of a target.

FIG. 5 illustrates a first phase of the first processing 41 consisting, on the basis of the radar 21:

in orienting several antenna beams 51 in the expected direction of arrival of the target 1, which is the craft that one wishes to guide;

and then in detecting the presence of the target 1 in the acquisition volume and in estimating its radial velocity Vr, its distance and its angular position in elevation eel and in azimuth $\theta_{az}$.

The measurement of the radial velocity is obtained conventionally by Doppler processing, and the angular position is obtained conventionally by a processing of monopulse or interferometric type, typically with the aid of several identical reception beams pointed in the direction of arrival.

Figure 6:
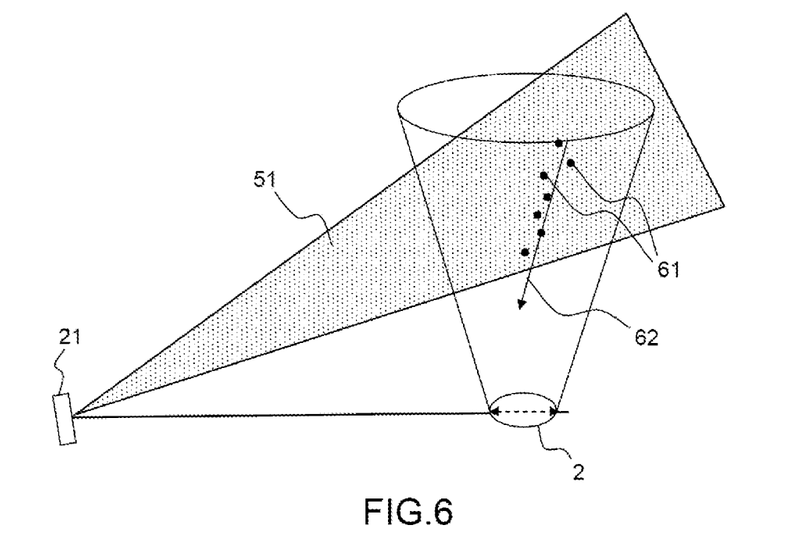
FIG. 6, a second phase of the said first processing estimating a rough trajectory of the target.

FIG. 6 illustrates a second phase of the first processing 41. In the direction of pointing 51 of the antenna beams, the radar engages a pursuit and roughly determines the trajectory of the detected target, along the distance axis, according to the speed and according to the angle.

The function of this step is in particular, on the basis of the successive plots of the positions 61 measured in the previous step, to estimate the directions of displacement and the corresponding speeds.

The trajectory 62 estimated on the basis of the successive discrete measurements 61 can be obtained by schemes known to the person skilled in the art, such as Kalman filtering, least squares, or any other scheme.

In this processing, the location performance is essentially limited by the dimension of the antenna of the radar and the signal-to-noise ratio in reception.

Typically, an antenna of length equal to 1 metre in the X-band exhibits an angular aperture of the order of 2° and a maximum precision of the order of 0.05°, i.e. a precision of location of the order of 10 metres at 10 kilometres.

This level of precision is not sufficient on its own to perform the guidance of the craft 1 along the vertical axis correctly.

The trajectory 62 estimated by this first processing 41 is used to characterize the motions of the target 1 in the horizontal plane and to provide the guidance system with the information corresponding to these motions making it possible to tailor the direction of the trajectory towards the envisaged landing spot 2.

The trajectory 62 is also used to orient and maintain the pointing of the antenna beams 51 in the direction of the target 1 in the course of its displacement.

By the second processing 42, the radar 21 determines more precisely the position, the trajectory and the motion of the target along the vertical axis, by increasing the angular resolution according to the principle of the inverse synthetic antenna, on the basis of the displacement of the target 1.

This second processing 42 is performed in a cyclic and continuous manner by successive time intervals T, each comprising a large number M of successive cycles of radar detection. A time interval T is for example of the order of 1 second.

The processing is performed in a limited angular domain, corresponding to the domain of displacement of the target during the time interval T.

The duration of this time interval is chosen so that the displacement of the target is large, typically several hundred metres, and that the direction of displacement can be considered to be constant for this duration.

The processing of the radar computes in a first phase, on the basis of the Doppler measurement, the radial velocity of the target at each radar detection cycle of duration T, each cycle comprising a number N of recurrences Tr.

In a second phase, for each detection cycle, the processing interpolates the various speed measurements so as to generate a history of estimated speeds at each recurrence, the whole constituting a set of M×N values over the duration of the time interval T. This interpolation consists, on the basis of the speed measurement established at each measurement cycle comprising N recurrences of duration Tr, in estimating the value of the speed at each recurrence constituting this measurement cycle. The interpolation is typically carried out in a linear manner, that is to say that for a speed variation $\Delta v$ obtained between two successive cycles corresponding to the time kTr and (k+1)Tr, the estimated speed variation for the recurrence of index n, lying between 0 and N, with respect to the instant kTr is $n\Delta v/N$.

Stated otherwise, on the basis of M speed measurements computed solely at each measurement cycle, M×N speed values are generated by interpolation between successive measurements.

On the basis of this history of estimated speeds, the processing calculates for a given radial distance $R_0$, and for various possibilities of angle of elevation of the target, an expected theoretical phase history of the signal received, the latter resulting from the outbound-inbound path traveled by the wave emitted by the radar.

For each possibility of angle of elevation, this phase history itself comprises M×N values.

The history is computed by assuming a vertical trajectory, from the initial radial distance $R_0$.

The various assumptions in respect of target elevation are chosen in the location uncertainty domain obtained by the first, rough, location processing by cutting this domain according to a very fine spacing, this spacing being dependent on the expected precision.

Typically, if the precision of location of the first processing is 0.1°, it is for example possible to envisage in the uncertainty domain 100 different values spaced 0.001° apart.

The second processing 42 carries out thereafter a processing "pseudo adapted" to the received signal, according to the radar wave's outbound-inbound phase history predetermined by the measurements of successive Doppler frequencies obtained over time, by considering the theoretical assumption of a vertical displacement. The filtering thus consists in phase correlating the signal received at each recurrence after demodulation by the carrier of the radar signal, with a replica corresponding to the theoretical phase history. The filtering is termed "pseudo adapted" since it takes into account a theoretical assumption of a rigorously vertical trajectory whilst the real trajectory may be slightly inclined with respect to the vertical.

Under these conditions, the processing carries out the operation:

$$P_{(R_0,\Theta_{elk})}(m) = \sum_{i=0}^{i=NM-1} s(i) s^*_{T((R_0,\Theta_{elk}))}(i-m)$$

where:
R$_0$ is the initial distance of the target;
θ$_{elk}$ is the angle of elevation of index k corresponding to the direction of initial detection of index k;
s(i)=e$^{jφ(i)}$ is the signal received after demodulation by the hyper frequency carrier at the recurrence of index i, by normalizing the modulus to 1;

$$s^*_{T((R_0,\Theta_{elk}))}(i-m) = e^{-j\varphi_{T((R_0,\Theta_{elk}))}(i-m)},$$

corresponds to the theoretical replica signal, in which $$\varphi_{T((R_0,\Theta_{elk}))}(i-m)$$

represents the theoretical phase of the expected signal at the recurrence of index i−m, for a vertical trajectory;
m is the index of the correlation filter, m varying from 0 to N×M−1.

The results of the correlations P$_{(R_0,\theta_{elk})}$(m) for each angle of elevation assumption θ$_{elk}$ each provide a correlation peak centred on the value m=0.

The value of θ$_{elk}$ for which the correlation peak is of largest amplitude provides:
the estimation of the angle of elevation θ$_{el}$=θ$_{elk}$ at the instant of the initial detection and the history of the speeds; and
the estimation of the positions of the target along the vertical axis for the time interval T over which the processing is applied.

In accordance with the SAR processing known to the person skilled in the art, the angular resolution obtained by this measurement corresponds roughly to the angular aperture of an antenna of length equivalent to twice the length of the displacement performed by the target for the time interval T, thus affording very high angular precision as well as very high precision of location of the target 1.

Typically, for a distance traveled of 100 m and a wavelength of 3 cm, the angular resolution obtained is of the order of:

$$\Delta\Theta = \frac{\lambda}{2L} = 0.15\,mrd,$$

which corresponds to a resolution transverse to the sighting axis of 1.5 m at 10 km.

The proposed processing 42 therefore makes it possible to achieve very high resolution, affording very high precision of location.

This value of the estimation of the angle of elevation θ$_{el}$ can further be refined, for example by computing the contrast between the amplitude of the strongest correlation peak obtained for θ$_{elk}$ and the amplitudes of the peaks obtained for the closest neighbouring values of k, namely k−1 and k+1.

Moreover, the width of the correlation peak is representative of the validity of the assumption of vertical trajectory.

The truer the assumption, the narrower the correlation peak, and conversely, the further the trajectory is from the vertical, the more the correlation peak tends to broaden.

The width of the correlation peak thus gives an indication relating to the verticality of the trajectory.

The evolution of the width of the correlation peak provides a criterion for validating the trajectory and makes it possible to correct the latter, as a function of the result of the rough estimation obtained by the first processing 41.

This second processing 42 of ISAR type, provides history of the altitude and of the vertical speed of the target with very high precision, and makes it possible to adjust the target deceleration control so as to culminate in a zero speed at the moment of touchdown.

It should be noted that the time interval T over which the synthetic antenna processing is performed can be modified during the descent phase as a function of the average speed of the target, in such a way as to tailor the resolution and the measurement precision according to need.

Thus, the apparent length of the synthetic antenna can be increased as the ground is approached so as to guarantee better precision in the final phase of the landing.

The annex presented at the end of the description specifies the mode of calculation of the filtering utilizing the correlation peaks.

On the basis of the analysis of the results obtained in each of the processings 41, 42, the radar estimates:
the disparity between the estimated trajectory and the vertical theoretical trajectory; and
the kinematic parameters of the target.

Next the radar transmits the corresponding information to the craft's guidance system.

In tandem with the iterations of this process, which is composed of the first processing 41 and of the second processing 42, the guidance system tends to make the trajectory of the craft 1 approach a trajectory that is closer and closer to a vertical trajectory, by acting in a known manner on the craft's control and/or propulsion means. The direction of displacement of the target is thus controlled so as to reduce on the one hand the disparity between the given trajectory and the trajectory estimated 62 in the first processing 41, and to reduce on the other hand the disparity between the given trajectory and the trajectory estimated by the second processing 42, projected on the vertical axis.

The effect of this is to focus the ISAR processing more and more precisely and to further advantageously increase the precision of angular location of the target 1.

In accordance with patent application FR 0412313, the craft 1 can be equipped with emission means of beacon type 23 (see FIG. 2) so as to provide a pointlike reference emission source whose position aboard the craft that one wishes to guide is perfectly known, and so as to strengthen the signal-to-noise ratio of the radar detection.

It is also possible to use a ground beacon 24, placed in proximity to the touchdown point (see FIG. 2), in accordance with patent application FR 0412313, to perform differential guidance of such a nature as to increase the landing precision. The beacons fitted to the craft or the ground beacons are for example according to patent application FR 1700264.

Moreover, in the case of an extended craft stretching along the vertical axis, typically in the case of a rocket-launcher stage, the resolution obtained by virtue of the inverse antenna processing can be used to "cut" the craft according to various slices along the vertical axis.

Indeed, given the vertical motion of the target, the various correlation peaks relating to the various vertical slices of the object are shifted temporally for one and the same angle of elevation.

It is thus possible to estimate the position and the trajectory of each of these slices independently, thus making it possible in particular to advantageously determine the attitude of the craft. It is also possible to use several responder beacons to estimate the attitude of the craft.

In addition to the high precision of location of the craft in the course of its evolution, descent or ascent, the invention affords other advantages.

In particular, on account of the very high angular resolution obtained in elevation, the method according to the invention is very insensitive to reflections on the ground. In particular, this enables the landing to be made safe, in particular when the descent phase is performed at high speed.

The radar system implementing the method according to the invention is lightweight and easily transportable.

The system can be positioned a short distance from the touchdown zone, thus permitting the use of an antenna 30 of small size and a low emission power, giving rise to low production and operating cost.

It does not require any motorization, thus facilitating calibration on site and strengthening reliability.

Finally, a radar system according to the invention can also be used for guidance according to a low descent slope, by adapting the processing.

ANNEX

For reasons of simplification of expression, the mathematical formalizations which follow correspond to a continuous temporal description, whilst the signal is in reality discretized at each radar recurrence, but this does not change the results.

Figure 7:
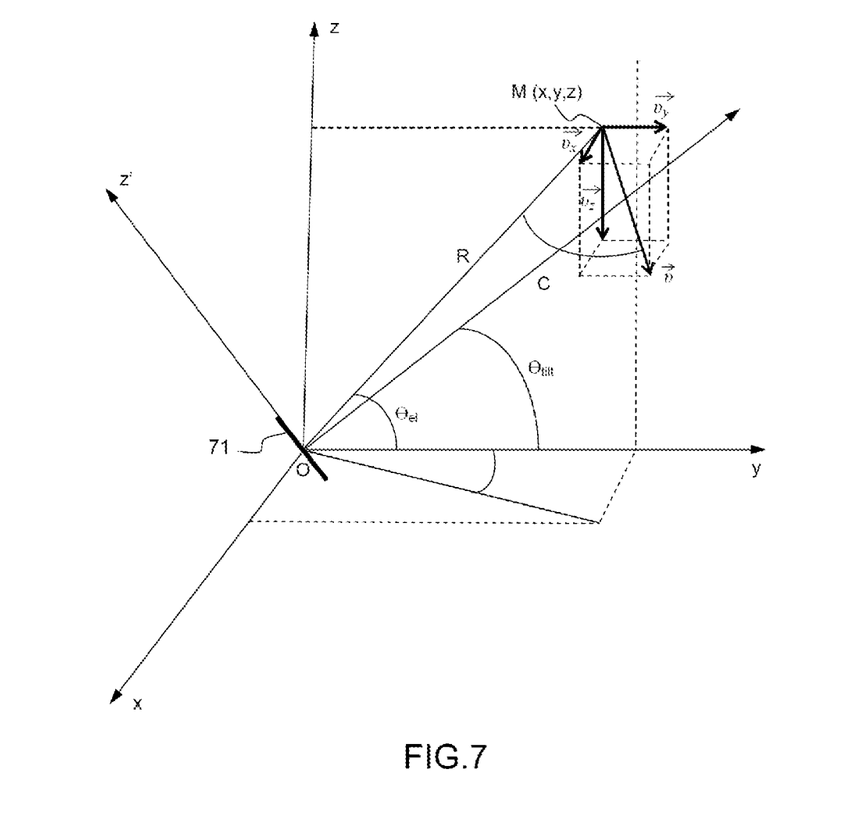
FIG. 7, a system of axes centred on the antenna of the radar in which the target is plotted.

According to the representation of FIG. 7, space is plotted with reference to an orthonormal frame (O, X, Y, Z) centred on the antenna 30, in which the axes OX and OY correspond to the horizontal plane and OZ to the vertical axis. The antenna is represented by its plane 71. The position M (x, y, z) of the target in this frame is thus defined:

| | | |
|---|---|---|
| x = R cosθel sinθaz | (1) | coordinate along the axis OX' |
| y = R cosθel cosθaz | (2) | coordinate along the axis OY' |
| z = R sinθel | (3) | coordinate along the axis OZ' | where R is the radial distance of the target from the radar:

$$R = \sqrt{x^2 + y^2 + z^2} \quad (4)$$

and where θel and θaz represent respectively the angles of elevation and of azimuth.

Moreover the velocity vector of the target is expressed as $$\vec{v} = \vec{v_x} + \vec{v_y} + \vec{v_z} \quad (5)$$

and the radial velocity as:

$$v_r = \frac{dR}{dt} = \frac{\lambda F_d}{2} \quad (6)$$

λ being the wavelength and $F_d$ the Doppler frequency.

Assuming a theoretical displacement that is purely vertical onwards of an initial distance $R_0 = \sqrt{x_0^2 + y_0^2 + z_0^2}$, it is possible to write the theoretical variation of the distance $R_T$ as a function of time t as:

$$R_T(t) = \sqrt{x_0^2 + y_0^2 + (z_0 - \widehat{v_z(t)} \, t)^2} \quad (7)$$

Where $\widehat{v_z(t)}$ is an estimate of $v_z(t)$, obtained by considering the vertical trajectory, in accordance with the relation:

$$v_r = \widehat{v_z(t)} \sin \Theta_{el} \quad (8)$$

The velocity $v_z(t)$ is a function of time, corresponding to the response of the target to the piloting control, i.e. typically in the case of a vertical landing to a uniform deceleration:

$$R_T(t) = \sqrt{R_0^2 - 2R_0 \widehat{v_z(t)} \cos\left(\frac{\pi}{2} - \Theta_{el}\right) t + v_z^2(t) t^2} \quad (9)$$

By considering a distance R0 which is much larger than the displacement $v_z(t)t$, the conventional formulation of SAR processing is obtained by finite expansion, with the particularity here of a time-varying speed of displacement $\widehat{v_z(t)}$:

$$R_T(t) = R_0 - \widehat{v_z(t)} \cos\left(\frac{\pi}{2} - \Theta_{el}\right) t + \frac{\widehat{v_z(t)}^2 t^2}{2R_0} \sin^2\left(\frac{\pi}{2} - \Theta_{el}\right) \quad (10)$$

hence, by combining with (8):

$$R_T(t) = R_0 - v_r(t) t + \frac{v_r^2(t) t^2}{2R_0} tg^2\left(\frac{\pi}{2} - \Theta_{el}\right) \quad (11)$$

For a vertical theoretical trajectory, the phase difference corresponding to the propagation of the radar wave over the outbound-inbound path may then be written:

$$\varphi_T(t) = \frac{-4\pi R_T(t)}{\lambda} = \frac{-4\pi}{\lambda}\left(R_0 - v_r(t) t + \frac{v_r^2(t) t^2}{2R_0} tg^2\left(\frac{\pi}{2} - \Theta_{el}\right)\right) \quad (12)$$

and the corresponding Doppler frequency:

$$Fd_T(t) = \frac{1}{2\pi} \frac{d\varphi_T(t)}{dt} = \frac{2}{\lambda}(v_{r0} + \gamma_r t)\left(1 - \frac{tg^2\left(\frac{\pi}{2} - \Theta_{el}\right)}{R_0} v_{r0} t\right) \quad (13)$$

where:

$\gamma_r(t)$ corresponds to the acceleration of the target at the instant t, which may be considered to be constant for the time interval $T\gamma_r(t) = \gamma_r$.

The doppler frequency band $B_d$ covered during the time interval T is:

$$B_d = \frac{2}{\lambda}\left(\frac{tg^2\left(\frac{\pi}{2} - \Theta_{el}\right)}{R_0} v_{r0}(v_{r0} + \gamma_r T)T - \gamma_r T\right) \quad (14)$$

A "pseudo adapted" filtering corresponding to the phase replica computed according to the theoretical assumption of vertical trajectory is applied to the signal received at each recurrence.

Thus, the processing carries out the operation:

$$P(\tau) = \int_{-\frac{T}{2}}^{\frac{T}{2}} s(t) s_T^*(t-\tau) dt \quad (15)$$

where s(t) is the signal received after demodulation by the hyper frequency carrier and s*(t) is the phase replica corresponding to a vertical trajectory:

$$s(t) = \text{Rect}_T(t) e^{j\varphi(t)} \quad (16)$$

where $\text{Rect}_T(t)$ is the rectangle function, which equals 1 between $-T/2$ and $+T/2$, and which is zero elsewhere.

$$s_{T^*(t-\tau)} = e^{-j\varphi_T(t-\tau)} \quad (17)$$

Considering the real trajectory of the target, we get:

$$R(t) = \sqrt{(x_0 - v_x(t)t)^2 + (y_0 - v_y(t)t)^2 + (z_0 - v_z(t)t)^2} \quad (18)$$

which may be written:

$$R(t) = \sqrt{(R_0^2 - 2v(t) R_0 t \cos C + v^2(t) t^2)} \quad (19)$$

where C is the angle between the direction of the target $\overrightarrow{OM_0}$ and the direction of the velocity vector $\vec{v}$.

And by performing the same finite expansion as previously:

$$R(t) = R_0 - v(t) t \cos C - \frac{v^2(t) t^2}{2 R_0} \sin^2 C \quad (20)$$

with:

$$v_r(t) = v \cos C \quad (21)$$

hence:

$$R(t) = R_0 - v_r(t) t - \frac{v_r^2(t) t^2}{2 R_0} tg^2 C \quad (22)$$

For the real trajectory, the phase difference corresponding to the propagation of the radar wave over the outbound-inbound path may then be written:

$$\varphi(t) = \frac{-4\pi R(t)}{\lambda} = \frac{-4\pi}{\lambda}\left(R_0 - v_r(t) t + \frac{v_r^2(t) t^2}{2 R_0} tg^2 C\right) \quad (23)$$

and the corresponding Doppler frequency:

$$Fd_T(t) = \frac{1}{2\pi} \frac{d\varphi_T(t)}{dt} = \frac{2}{\lambda}(v_{r0} + \gamma_r t)\left(1 - \frac{tg^2 C}{R_0} v_{r0} t\right) \quad (24)$$

The Doppler frequency band $B_d$ covered during the time interval T is:

$$B_d = \frac{2}{\lambda}\left(\frac{tg^2 C}{R_0} v_{r0}(v_{r0} + \gamma_r T) T - \gamma_r T\right) \quad (25)$$

The result of the "pseudo" adapted processing is:

$$|P(\tau)| = \left|\int_{-\frac{T}{2}}^{\frac{T}{2}} \text{Rect}_T(t-\tau) e^{j(\varphi(t) - \varphi_T(t-\tau))} dt\right|$$

$$\varphi(t) - \varphi_T(t-\tau) = \frac{-4\pi}{\lambda}(v_r(t) t - v_r(t)(t-\tau)) -$$
$$\frac{2\pi}{\lambda R_0}\left(v_r^2(t)\left(tg^2 C t^2 - tg^2\left(\frac{\pi}{2} - \Theta_{el}\right)(t-\tau)^2\right)\right)$$

$$\varphi(t) - \varphi_T(t-\tau) = -\frac{4\pi}{\lambda}\left(-v_r(t)\tau + \frac{v_r^2(t)}{2R_0}\left(\left(tg^2 C - tg^2\left(\frac{\pi}{2} - \Theta_{el}\right)\right)t^2\right) + 2\right.$$
$$\left. tg^2\left(\frac{\pi}{2} - \Theta_{el}\right)\tau t - tg^2\left(\frac{\pi}{2} - \Theta_{el}\right)\tau^2\right) = -$$

$$\frac{4\pi}{\lambda}\left(-v_r(t)\tau + \frac{v_r^2(t)}{2R_0}\left(2 tg^2\left(\frac{\pi}{2} - \Theta_{el}\right)\tau t - tg^2\left(\frac{\pi}{2} - \Theta_{el}\right)\tau^2\right)\right) = -$$

$$\frac{4\pi \tau}{\lambda}\left(-1 + \frac{v_r(t)}{2R_0} tg^2\left(\frac{\pi}{2} - \Theta_{el}\right)(2t - \tau)\right)$$

In the case where the theoretical assumption is satisfied, that is to say if $v = v_z$, the angles C and $$\frac{\pi}{2} - \Theta_{el}$$

are equal, and the result of the filtering $|P(\tau)|$ simplifies to:

$$|P(\tau)| = \left|\int_{-\frac{T}{2}}^{\frac{T}{2}} \text{Rect}_T(t-\tau) e^{j\frac{4\pi \tau v_r(t)}{\lambda}\left(1 - \frac{v_r(t)}{2R_0} tg^2\left(\frac{\pi}{2} - \Theta_{el}\right)(2t - \tau)\right)} dt\right|$$

The function $|P(\tau)|$ exhibits a peak centred on $\tau=0$, of amplitude T.

Moreover, if the speed vu varies relatively little during the integration time, the correlation peak exhibits a shape close to a cardinal sine, whose −3 dB width $\Delta T$ is close to the inverse of the Doppler frequency band scanned during the observation time $$\Delta T = \frac{1}{B_d}.$$

In the case where the theoretical assumption is not rigorously satisfied, the function $|P(\tau)|$ exhibits a broadened peak, centred on $\tau=0$:

$$|P(\tau)| = \left|\int_{-\frac{T}{2}}^{\frac{T}{2}} \text{Rect}_T(t-\tau)\right.$$
$$\left. e^{-j\left(\frac{4\pi \tau v_r(t)}{\lambda}\left(1 - \frac{v_r(t)}{2R_0} tg^2\left(\frac{\pi}{2} - \Theta_{el}\right)(2t - \tau)\right) - \frac{2\pi v_r^2(t)}{\lambda R_0}\left(tg^2 C - tg^2\left(\frac{\pi}{2} - \Theta_{el}\right)\right)t^2\right)} dt\right|$$

The broadening of the correlation peak is due to the appearance of the phase term ψ(t) which is quadratic in t:

$$\psi(t) = \frac{2\pi v_r^2(t)}{\lambda R_0}\left(\left(tg^2 C - tg^2\left(\frac{\pi}{2} - \Theta_{el}\right)\right)\right)t^2$$

This term tends to decrease as the trajectory tends to the vertical, that is to say as the angle C approaches the angle $\left(\frac{\pi}{2} - \Theta_{el}\right)$, at $\tau = 0$:

$$|P(\tau)| = \left|\int_{-\frac{T}{2}}^{\frac{T}{2}} e^{-j\left(\frac{2\pi}{\lambda R_0}v_r^2(t)\left(tg^2 C - tg^2\left(\frac{\pi}{2}-\Theta_{el}\right)\right)t^2 - \frac{4\pi}{\lambda}v_r(t)\tau\right)} dt\right|$$

The invention claimed is:

1. A method of guiding an aerial target towards a given trajectory, comprising:
   a first radar processing for locating and estimating a trajectory of the target on the basis of measurements of radial distances, of Doppler frequency, and of angles of azimuth and of angles of elevation of the target arising from a radar signal emitted towards the target;
   a second radar processing for locating and estimating the trajectory of said target projected on a vertical axis, by applying a principle of an inverse synthetic antenna;
   projecting on a horizontal plane a first disparity between the given trajectory and the trajectory estimated by the first processing, and
   projecting on the vertical axis a second disparity between the given trajectory and the trajectory estimated by the second processing;
   the method being used to control a direction of displacement of the target, the direction being controlled so as to reduce the first disparity and the second disparity.

2. The method according to claim 1, wherein the given trajectory is vertical.

3. The method according to claim 1, wherein the given trajectory is oriented towards a touchdown zone, the said target being in a landing phase.

4. The method according to claim 1, wherein the first disparity and the second disparity are computed by radar processing circuits and transmitted to a displacement direction control system of the target.

5. The method according to claim 1, wherein the second radar processing establishes in a continuous manner a history of successive radial velocities measured through the Doppler effect so as to determine a phase replica corresponding to an outbound-inbound path of the radar signal emitted over a limited time interval, the history being used to construct a correlator of a radar signal received, the correlator being applied for distance measurement of the target by the first radar processing according to various possible values of an angle of elevation of the target inside an uncertainty domain of the first radar processing.

6. The method according to claim 5, wherein a correlation peak of maximum level in the phase replica determines the angle of elevation of the target and a speed of the target along the vertical axis.

7. The method according to claim 6, wherein the angle of elevation of the target is refined by measurement of contrast between an amplitude of the correlation peak of maximum level and phase replicas of closer neighborhoods.

8. The method according to claim 5, wherein a measurement of the width of a correlation peak is used to estimate a verticality of the trajectory followed by the target along the vertical axis.

9. The method according to claim 5, wherein the second radar processing, according to the inverse synthetic antenna principle, is carried out in an angular domain corresponding to a distance traveled by the target in the limited time interval.

10. The method according to claim 9, wherein the limited time interval is limited by a duration for which a direction of the trajectory of the target can be considered to be fixed projected on the vertical axis.

11. The method according to claim 1, wherein said method uses one or more airborne beacons carried by the target to establish a pointlike location reference.

12. The method according to claim 1, wherein said method uses one or more ground beacons to perform differential location measurements.

13. The method according to claim 1, wherein the second radar processing is used to estimate an attitude of the target, the being cut according to various slices along the vertical axis, the various correlation peaks relating to the various slices of the target which are shifted temporally for one and the same angle of elevation making it possible to determine advantageously the attitude of the target.

14. The method according to claim 1, wherein the target is a first stage of a rocket launcher.

15. A radar system, configured to implement the method of claim 1.

16. The radar system according to claim 15, comprising a fixed multibeam antenna.

* * * * *

UNITED STATES PATENT AND TRADEMARK OFFICE
CERTIFICATE OF CORRECTION

| | |
|---|---|
| PATENT NO. | : 10,775,496 B2 |
| APPLICATION NO. | : 15/933252 |
| DATED | : September 15, 2020 |
| INVENTOR(S) | : Pascal Cornic et al. |

Page 1 of 1

It is certified that error appears in the above-identified patent and that said Letters Patent is hereby corrected as shown below:

In the Claims

In Claim 3, Column 13, Line 45, "the said target being in a landing phase." should be -- the target being in a landing phase. --.

In Claim 13, Column 14, Line 41, "the being cut according to various" should be -- the target being cut according to various --.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*